United States Patent
Ota et al.

[11] Patent Number: 6,149,888
[45] Date of Patent: Nov. 21, 2000

[54] METHOD OF PRODUCING ANHYDROUS ZINC ANTIMONATE

[75] Inventors: Isao Ota; Osamu Tanegashima, both of Funabashi; Hideo Sakata, Sodegaura, all of Japan

[73] Assignee: Nissan Chemical Industries, Ltd., Tokyo, Japan

[21] Appl. No.: 09/215,220

[22] Filed: Dec. 18, 1998

[30] Foreign Application Priority Data

Dec. 26, 1997 [JP] Japan ................................. 9-359474

[51] Int. Cl.⁷ .............................. C01G 28/00; C01G 9/02
[52] U.S. Cl. ........................................... 423/617; 423/622
[58] Field of Search .................................. 423/617, 622

[56] References Cited

U.S. PATENT DOCUMENTS

| | | |
|---|---|---|
| 3,984,353 | 10/1976 | Sergunkin et al. . |
| 4,110,247 | 8/1978 | Gower, II et al. . |
| 4,472,296 | 9/1984 | Hunter, Jr. et al. ............ 252/519 |
| 5,707,552 | 1/1998 | Watanabe et al. ............ 252/309 |
| 5,739,742 | 4/1998 | Iga et al. ........................ 338/21 |
| 5,766,512 | 6/1998 | Watanabe et al. ............ 252/309 |
| 5,770,113 | 6/1998 | Iga et al. ........................ 252/519.51 |
| 5,906,679 | 5/1999 | Watanabe et al. ............ 106/286.6 |

FOREIGN PATENT DOCUMENTS

| | | |
|---|---|---|
| 0 686 600 A1 | 12/1995 | European Pat. Off. . |
| 52-21298 | 2/1977 | Japan . |
| B2-57-11848 | 3/1982 | Japan . |
| 60-41536 | 3/1985 | Japan . |
| 61-3292 | 1/1986 | Japan . |
| 62-125849 | 6/1987 | Japan . |
| 62-182116 | 8/1987 | Japan . |
| 3-267143 | 11/1991 | Japan . |
| 6-219743 | 8/1994 | Japan . |

*Primary Examiner*—Steven P. Griffin
*Assistant Examiner*—Cam N. Nguyen
*Attorney, Agent, or Firm*—Oliff & Berridge, PLC

[57] ABSTRACT

A method of producing electroconductive anhydrous zinc antimonate, comprising the steps of mixing a zinc compound and a colloidal antimony oxide in a $ZnO/Sb_2O_5$ molar ratio of 0.8 to 1.2; and calcining the mixture of 300 to 680° C. in a gas containing steam to produce an electroconductive anhydrous zinc antimonate having a $ZnO/Sb_2O_5$ molar ratio of 0.8 to 1.2 and a primary particle diameter of 5 to 100 nm. The substance is useful as an antistatic agent, an ultraviolet absorbent, a heat ray absorbent, and a sensor, for example.

10 Claims, 1 Drawing Sheet

METHOD OF PRODUCING ANHYDROUS ZINC ANTIMONATE

BACKGROUND OF THE INVENTION

1. Field of Invention

The present invention related to a method of producing anhydrous zinc antimonate having electroconductivity. The anhydrous zinc antimonate of the present invention may be used in various purpose, for example, an antistatic agent for plastics and glass, an ultraviolet absorbent, a heat ray absorbent, and a sensor.

2. Background of Related Art

Japanese Patent Application Laid-open No. 267143/1991 discloses a composition comprising diantimony pentoxide and zinc oxide, which is obtained by mixing basic zinc carbonate and an acidic aqueous sol of diantimony pentoxide in a molar ratio, $ZnO/Sb_2O_5$, of 0.5 to 10 to form a homogenous slurry, decarboxylating the basic carbonate in the slurry at 50 to 100° C. until a molar ratio, $CO_5/ZnO$, or $\frac{1}{5}$ to $\frac{1}{500}$ is reached, and drying the slurry at 150 to 250° C.

Further, Japanese Patent Application Laid-open No. 219743/1994 discloses a method of producing anhydrous zinc antimonate by mixing a zinc compound and colloidal antimony oxide in a molar ratio, $ZnO/Sb_2O_5$, of 0.8 to 1.2, calcining the mixture at 500 to 680° C. to obtain anhydrous zinc antimonate having a primary particle diameter of 5 to 500 nm and an electroconductivity of 0.1 k Ω to 1 M Ω.

SUMMARY OF THE INVENTION

Japanese Patent Application Laid-open No. 267143/1991 discloses to a deodorant and its production method. However, the mixing of diantimony pentoxide and basic zinc carbonate gives rise to a product which shows the characteristic peak of diantimony pentoxide upon X ray diffraction measurement but shows no peak that is characteristic to anhydrous zinc antimonate since the calcination temperature used is as low as 50 to 100° C.

According to the method disclosed in Japanese Patent Application Laid-open No. 219743/1994, anhydrous zinc antimonate having electroconductivity is produced by calcination at 500 to 680° C.

In view of the prior art described above, an object of the present invention relates to an improvement in a method of producing electroconductive anhydrous zinc antimonate. Another object of the present invention is to provide a method of producing anhydrous zinc antimonate that permits production of electroconductive anhydrous zinc antimonate at relatively low temperatures by controlling atmosphere during calcination step after mixing a zinc compound and colloidal antimony oxide, which is advantageous from the viewpoints of simplification of apparatus and energy saving and which is free of generation of big particles due to sintering of smaller particles thanks to the low calcination temperature.

In the present invention, in a first embodiment, there is provided a method of producing electroconductive anhydrous zinc antimonate, comprising the steps of: mixing a zinc compound and a colloidal antimony oxide in a $ZnO/Sb_2O_5$ molar ratio of 0.8 to 1.2; and calcining the mixture at 300 to 680° C. in a gas containing steam to produce an electroconductive anhydrous zinc antimonate having a $ZnO/Sb_2O_5$ molar ratio of 0.8 to 1.2 and a primary particle diameter of 5 to 100 nm.

In a second embodiment, there is provided the method in which the calcination is carried out at a temperature of 350° C. or higher and below 500° C.

In a third embodiment, there is provided the method in which the electroconductive anhydrous zinc antimonate has a primary particle diameter of 5 to 50 nm.

In a fourth embodiment, there is provided the method in which the gas is air or nitrogen.

DETAILED DESCRIPTION OF PREFERRED EMBODIMENTS

Figure 1:
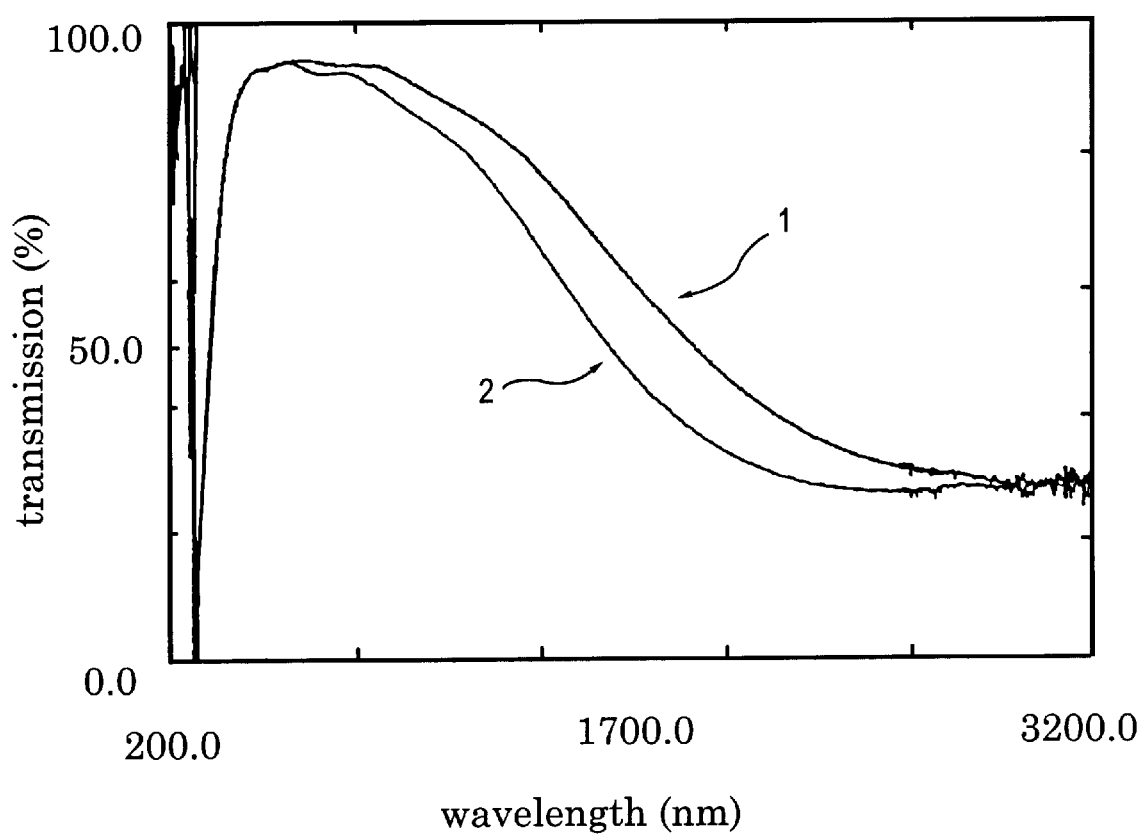
FIG. 1 is a chart illustrating percent transmissions of glass plates coated with electroconductive anhydrous zinc antimonate sols obtained in Example 5 and Comparative Example 2, respectively, in a range of a wavelength of 200 to 3,200 nm.

In the case where the colloidal antimony oxide is antimony oxide sol, the method of producing electroconductive anhydrous zinc antimonate according to the present invention can be produced by mixing antimony oxide sol and a zinc compound, and then calcining the mixture at 300 to 680° C. after drying.

The zinc compound which can be used in the present invention is at least one zinc compound selected from the group consisting of zinc hydroxide, zinc oxide, inorganic acid salts of zinc and organic salts of zinc.

The inorganic acid salts of zinc include zinc carbonate, basic zinc carbonate, zinc nitrate, zinc chloride, zinc sulfate and the like. The organic acid salts of zinc include zinc formate, zinc acetate, zinc oxalate and the like. These zinc compounds may be those put on the market as industrial chemicals. When zinc hydroxide and zinc oxide are used, it is preferred that they have a primary particle diameter of 100 nm or less. In particular, the salts containing acids that vaporize upon calcination, for example, carbonate salts and organic acid salts, are preferred. They may be used alone or as admixtures of two or more of them.

The colloidal antimony oxide which can be used in the present invention is antimony oxide having a primary particle diameter of 100 nm or less and includes diantimony pentoxide sol, hexaantimony tridecaoxide sol, diantimony tetroxide hydrate sol, colloidal diantimony trioxide and the like. The diantimony pentoxide sol can be produced by known methods, for example, a method in which diantimony trioxide is oxidized (Japanese Patent Publication No. 11848/1982), a method in which an alkali antimonate is dealkalized with ion exchange resin (U.S. Pat. No. 4,110,247), a method in which sodium antimonate is treated with an acid (Japanese Patent Application Laid-open Nos. 41536/1985 and 182116/1987), and the like. The hexaantimony tridecaoxide sol can be produced by a method in which diantimony trioxide is oxidized (Japanese Patent Application Laid-open No. 125849/1987) and the diantimony tetroxide hydrate sol can also be produced by a method in which diantimony trioxide is oxidized (Japanese Patent Application Laid-open No. 21298/1977). The colloidal diantimony trioxide can be produced by a gas phase method (Japanese Patent Publication No. 3292/1986).

As the antimony oxide sol that can be used in the present invention, there is particularly preferred an acidic sol that has a primary particle diameter of 2 to 100 nm, preferably 2 to 50 nm, and that contains no base such as amine or sodium hydroxide. As the antimony oxide sol, there can be used those sols that contain antimony oxide ($Sb_2O_5$, $Sb_5O_{1\cdot3}$, or $Sb_2O_4$) in a concentration of 1 to 60% by weight. They may be used in the form of a dried antimony oxide sol that is prepared by spray drier, vacuum drier, freeze drier or the like. As the colloidal antimony oxide, there may be used those commercially available as industrial chemicals in the form of diantimony pentoxide sol, diantimony pentoxide powder, or diantimony trioxide superfine powder.

The antimony oxide which can be used as a starting material may be selected such that its particle diameter range is a little broader than that of the produce since calcination of it together with a zinc compound to form electroconductive anhydrous zinc antimonate is accompanied by a slight variation in particle diameter.

In the case where the diantimony pentoxide sol is used as a starting material in the present invention, a ZnO-doped diantimony pentoxide sol may be used as a starting material. The ZnO-doped diantimony pentoxide sol that can be obtained by dispersing diantimony trioxide and basic zinc carbonate in a water in a molar ratio, $ZnO/Sb_2O_5$, of 0.1 to 0.2 and by reacting the dispersion with hydrogen peroxide. Note that the doped ZnO shall be included in the $ZnO/Sb_2O_5$ molar ratio of 0.8 to 1.2 of a finally obtained electroconductive, anhydrous zinc antimonate.

The mixing of the above-described zinc compound with the antimony oxide sol may be performed using a mixing apparatus such as SATAKE-type mixing apparatus, Fhaudler-type mixing apparatus, or disper at a temperature of 0 to 100° C. for 0.1 to 30 hours. The mixing of the above-described zinc compound with a dry product of the antimony oxide sol or colloidal diantimony trioxide may be conducted using an apparatus such as a mortar, a V-type mixer, a Henschel mixer, or a ball mill.

In the present invention, it is preferred that the zinc compound and antimony oxide sol or its dried product or colloidal diantimony trioxide be mixed so that the mixture can have a $ZnO/Sb_2O_5$ molar ratio of 0.8 to 1.2. The slurry (mixture) of the zinc compound and the antimony oxide sol can be dried using a spray drier, a drum dryer, a box-type hot air drier with circulation, a vacuum drier, or a freeze drier at 300° C. or less. The slurry may be dried by separating the slurry by suction filtering, centrifugation filtering, or using a filter press and optionally removing soluble impurities (such as $So_4$ that is difficult to vaporize upon calcination) from the starting material by pouring of water to form a wet cake, and drying the wet cake in the above box-type hot air drier with circulation and the like at a temperature ranging from room temperature to 300° C. The drying is performed preferably at 300° C. or less taking into consideration the apparatus or operation and the calcination temperature which will be described below.

In the present invention, a dried product of mixture of the zinc compound and antimony oxide sol, a mixture of the zinc compound and a dried product of antimony oxide sol or mixture of the zinc compound and colloidal diantimony trioxide is calcined in a gas containing steam at a temperature of 300 to 680° C., preferably no lower than 350° C. and below 500° C., and most preferably no lower than 400° C. and below 500° C. for 0.5 to 50 hours, preferably 2 to 20 hours. The temperature of no lower than 400° C. and below 500° C. is most preferred in order to obtain sols having good electroconductivity and suffering from less agglomeration.

Here, the introduction of steam is performed at 100° C. or higher in order to prevent the occurrence of frosts. The calcination initiates solid phase reaction to produce electroconductive anhydrous zinc antimonate of the present invention. The gas described above includes oxidizing gas, reducing gas, and inert gas. Examples of the oxidizing gas include oxygen, air, a mixed gas consisting of nitrogen and oxygen, and a mixed gas of nitrogen and air. The reducing gas includes, for example, hydrogen and carbon monoxide. The inert gas includes, for example, nitrogen, carbon dioxide, helium and argon. It is particularly preferred to use air or nitrogen.

The partial pressure ratio of water vapor to the gas, i.e., partial pressure of steam/partial pressure of the gas, is 0.05 to 2, preferably 0.10 to 1.0. The partial pressure ratio of steam to the gas can be controlled by a method which involves bubbling the gas into a water bath to control the partial pressure ratio of water vapor based on the water bath temperature or a method which involves directly mixing the gas with steam at 100° C. or higher.

The electroconductive anhydrous zinc antimonate of the present invention has a color that varies from deep blue to deep indigo based on the conditions of calcination and so on, has a resistance of 0.1 k Ω to 1 M Ω, and has electroconductivity due to conduction of electrons. Mold articles obtained by press molding at 300 kg/cm² have a resistivity of 1Ω·cm to 10kΩ·cm.

X-ray diffraction measurements revealed that the electroconductive anhydrous zinc antimonate obtained by the present invention has a peak that is identical to the peaks of zinc antimonate described in ASTM (Index to the X-ray Powder Data File Inorganic) where ASTM Nos. 3-0455 and 11-214 correspond to $ZnSb_2O_6$. and $Zn(SbO_3)_2$, respectively, and no peak corresponding to zinc oxide or anhydrous diantimony pentoxide was observed. Therefore, the electroconductive anhydrous zinc antimonate of the invention was judged to have the structure of $ZnSb_2O_6$. Also, it revealed that the X-ray diffraction peak of the anhydrous zinc antimonate is located further on the side of lower diffraction angles than the peak positions described in ASTM, making it evident that the compound of the invention has an open structure. Further, the results of differential thermal analysis (DTA-TG) confirmed that the electroconductive anhydrous zinc antimonate showed no loss of weight at a temperature of room temperature to 1,000° C. and was judged to be anhydrous zinc antimonate, which has no water of crystallization.

As a result of observation on a transmission electron microscope, it was confirmed that the electroconductive anhydrous zinc antimonate comprises as fine particles as colloid, with a primary particle diameter on the order of 5 to 100 nm, preferably 5 to 50 nm. Here, the term "primary particle diameter" means the diameter of a single separated particle, but not the diameter of agglomerate of the particles, which can be measured by electron microscopic observation.

The electroconductive anhydrous zinc antimonate obtained by the present invention, due to remarkably small sintering upon calcination, can readily be ground by dry grinding process using a jet-o-mizer, a pin disk mill, a ball mill or the like to a particle diameter of 2 μm or less even when it is in the form of agglomerate of particles. Further, the electroconductive anhydrous zinc antimonate of the present invention can readily be converted into an aqueous or organic solvent sol by wet grinding of it in water or an organic solvent using a sand grinder, a ball mill, a homogenizer, a disper, a colloid mill or the like. In addition, it was confirmed that the electroconductive anhydrous zinc antimonate of the present invention did not convert into its hydrate and remained anhydrous even when ground or heated in water.

In the case where the electroconductive anhydrous zinc antimonate of the present invention is wet ground to form an aqueous or organic solvent sol of anhydrous zinc antimonate, the sol can, if desired, be stabilized by addition of an alkylamine such as ethylamine, propylamine, isopropylamine, or diisobutylamine, an alkanolamine such as triethanolamine or monoethanolamine, a diamine such as ethylenediamine, hydroxycarboxylic acid such as lactic acid, tartaric acid, malic acid, or citric acid. As the organic solvent, there can be used alcohols such as methyl alcohol, ethyl alcohol, propyl alcohol, and butyl alcohol, glycols such as ethylene glycol, diethylene glycol, and hexylene glycol, cellosolves such as ethylcellosolve and propylcellosolve, and amides such as dimethylformamide and dimethylacetamide. The anhydrous zinc antimonate has a particle diameter of 100 nm or less in the aqueous or organic solvent sol.

In producing the electroconductive anhydrous zinc antimonate of the present invention, in the case of calcination in a gas containing no water vapor as in a conventional method for the production of anhydrous zinc antimonate, due to an insufficient progress of the solid phase reaction, relatively high temperature was necessary in order to obtain anhydrous zinc antimonate. However, it is expected that calcination at above 680° C. will produce non-electroconductive anhydrous zinc antimonate and that at higher calcination temperatures smaller particles tend to sinter so that big particles will be generated.

On the other hand, in the case where calcination is carried out in a gas that contains stream as in the present invention, steam acts as a promoter for a solid phase reaction. Therefore, presence of steam allows calcination to be carried out at lower temperatures so that sintering of particles to each other upon calcination is suppressed. This makes it easy to produce a sol. In particular, calcination in a steam-containing gas is useful in producing electroconductive anhydrous zinc antimonate having a primary particle diameter of 5 to 50 nm. This is because progress of solid phase reaction to a sufficient degree will cause a powder having colors of deep blue to deep indigo, which is characteristic to electroconductive anhydrous zinc antimonate. Also, lower temperature calcination enables one to save energy costs.

Since use of a reducing gas, such as hydrogen, alone that contains no steam results in the reduction of the antimony oxide component in zinc antimonate at 350° C. or higher to form metallic antimony, presence of steam is indispensable even when a reducing gas such as hydrogen is used. On the other hand, since steam acts as a suppressor for the reduction reaction of the oxide component, presence of steam can prevent the reduction of a portion of anhydrous zinc antimonate.

The anhydrous zinc antimonate obtained by the present invention can be mixed with a silicon-containing substance such as a silane coupling agent to form a coating composition.

The above-described silicon-containing substance includes at least one compound selected from the group consisting of organic silicon compounds represented by general formula (I)

  (I)

wherein $R^1$ and $R^3$ independently represent an alkyl group, an aryl group, a halogenated alkyl group, a halogenated aryl group, an alkenyl group, or an organic group having an epoxy group, an acryloyl group, a methacryloyl group, a mercapto group, an amino group, or a cyano group as a substituent, and are bonded to the silicon atom through a Si—C bond; $R^2$ represents an alkyl group, an alkoxyalkyl group, or an acyl group having 1 to 8 carbon atoms; a and b is 0, or an integer of 1 or 2, provided that a+b is 0, or an integer of 1 or 2, or by general formula (II):

  (II)

wherein $R^4$ represents an alkyl group having 1 to 5 carbon atoms; X represents an alkyl group or an acyl group having 1 to 4 carbon atoms; Y represents a methylene group or an alkylene group having 2 to 20 carbon atoms; and c is 0 or an integer of 1, and hydrolysates thereof.

The above-described silicon-containing substance in the case of $(R^1)_a(R^3)_b Si(OR^2)_{4-(a+b)}$ includes organic silicon compounds in which $r^1$ and $R^3$ represent the same organic group or different organic groups and/or a and b are the same number, or different numbers. Examples of the organic silicon compounds represented by general formula (I) above include
tetramethoxysilane,
tetraethoxysilane,
tetra-n-propoxysilane,
tetraisopropoxysilane,
tetra-n-butoxysilane,
tetraacetoxysilane,
methyltrimethoxysilane,
methyltripropoxysilane,
methyltriacetoxysilane
methyltributoxysilane,
methyltripropoxysilane,
methyltriamyloxysilane,
methyltriphenoxysilane,
methyltribenzyloxysilane,
methyltriphenethyloxysilane,
glycidoxymethyltrimethoxysilane,
glycidoxymethyltriethoxysilane,
α-glycidoxyethyltrimethoxysilane,
α-glycidoxyethyltriethoxysilane,
β-glycidoxyethyltrimethoxysilane,
β-glydoxyethyltriethoxysilane,
α-glycidoxypropyltrimethoxysilane,
α-glycidoxypropyltriethoxysilane,
β-glycidoxypropyltrimethoxysilane,
β-glycidoxypropyltriethoxysilane,
γ-glycidoxypropyltrimethoxysilane,
γ-glycidoxypropyltriethoxysilane,
γ-glycidoxypropyltripropoxysilane,
γ-glycidoxypropyltributoxysilane,
γ-glycidoxypropyltriphenoxysilane,
α-glycidoxybutyltrimethoxysilane,
α-glycidoxybutyltriethoxysilane,
β-glycidoxybutyltriethoxysilane,
γ-glycidoxybutyltrimethoxysilane,
γ-glycidoxybutyltriethoxysilane,
δ-glycidoxybutyltrimethoxysilane,
δ-glycidoxybutyltriethoxysilane,
(3,4-epoxycyclohexyl)methyltrimethoxysilane,
(3,4-epoxycyclohexyl)methyltriethoxysilane,
β-(3,4-epoxycyclohexyl)ethyltrimethoxysilane,
β-(3,4-epoxycyclohexyl)ethyltriethoxysilane,
β-(3,4-epoxycyclohexyl)ethyltripropoxysilane,
β-(3,4-epoxycyclohexyl)ethyltributoxysilane,
β-(3,4-epoxycyclohexyl)ethyltriphenoxysilane,
γ-(3,4-epoxycyclohexyl)propyltrimethoxysilane,
γ-(3,4-epoxycyclohexyl)propyltriethoxysilane,
δ-(3,4-epoxycyclohexyl)butyltrimethoxysilane,
δ-(3,4-epoxycyclohexyl)butyltriethoxysilane, glycidoxymethylmethyldimethoxysilane,
glycidoxymethylmethyldiethoxysilane,
α-glycidoxyethylmethyldimethoxysilane,
α-glycidoxyethylmethyldiethoxysilane,
β-glycidoxyethylmethyldimethoxysilane,
β-glycidoxyethyldimethoxysilane,
α-glycidoxypropylmethyldimethoxysilane,
α-glycidoxypropylmethyldiethoxysilane,
β-glycidoxypropylmethyldimethoxysilane,
β-glycidoxypropylethyldimethoxysilane,
γ-glycidoxypropylmethyldimethoxysilane,
γ-glycidoxypropylmethyldiethoxysilane,
γ-glycidoxypropylmethyldipropoxysilane,
γ-glycidoxypropylmethyldibutoxysilane,
γ-glycidoxypropylmethyldiphenoxysilane,
γ-glycidoxypropylethyldimethoxysilane,
γ-glycidoxypropylethyldiethoxysilane,
γ-glycidoxypropylvinyldimethoxysilane,
γ-glycidoxypropylvinyldiethoxysilane,
ethyltrimethoxysilane,
ethyltriethoxysilane,
vinyltrimethoxysilane,
vinyltriethoxysilane,
vinyltriacetoxysilane,
phenyltrimethoxysilane,
phenyltriethoxysilane,
phenyltriacetoxysilane,
γ-cholorpropyltrimethoxysilane,
γ-chloropropyltriethoxysilane,
γ-chloropropyltriacetoxysilane,
3,3,3-trifluoropropyltrimethoxysilane,
γ-methacryloxypropyltrimethoxysilane,
γ-mercaptopropyltrimethoxysilane,
γ-mercaptopropyltriethoxysilane,
β-cyanoethyltriethoxysilane,
chloromethyltrimethoxysilane,
chloromethyltriethoxysilane,
N-(β-aminoethyl)-γ-aminopropyltrimethoxysilane,
N-(β-aminoethyl)-γ-aminopropylmethyldimethoxysilane,
γ-aminopropylmethyldimethoxysilane,
N-(β-aminoethyl)-γ-aminopropyltriethoxysilane,
N-(β-aminoethyl)-γ-aminopropylmethyldiethoxysilane,
dimethyldimethoxysilane,
phenylmethyldimethoxysilane,
dimethyldiethoxysilane,
phenylmethyldiethoxysilane,
γ-chloropropylmethyldimethoxysilane,
γ-chloropropylmethyldiethoxysilane,
dimethyldiacetoxysilane,
γ-methacryloxypropylmethyldimethoxysilane,
γ-methacryloxypropylmethyldiethoxysilane,
γ-mercaptopropylmethyldimethoxysilane,
γ-mercaptomethyldiethoxysilane,
methylvinyldimethoxysilane,
methylvinyldiethoxysilane,
and so on. These can be used alone or admixtures of two or more of them.

Further, the hydrolysates of the organic silicon compound represented by general formula (I) become compounds derived from the organic silicon compound represented by general formula (I) by hydrolysis so that a part or all of the substituents ($R^2$)s is or are substituted by hydrogen atom(s). The hydrolysates of the organic silicon compound represented by general formula (I) may be used alone or two or more of them may be used in combination.

The organic silicon compound represented by general formula (II) above $[(R^4)_c Si(OX)_{a-c}]_2 Y$ includes, for example,
methylenebismethyldimethoxysilane,
ethylenebisethyldimethoxysilane,
propylenebisethyldiethoxysilane,
buytlenebismethyldiethoxysilane, and so on. These may be used alone or two or more of them may be used in combination.

The hydrolysates of the organic silicon compound represented by general formula (II) above become compounds derived from the organic silicon compound represented by general formula (II) above by hydrolysis so that a part or all of the substituents X's is or are substituted by hydrogen atom(s). The hydrolysates of the organic silicon compound of the general formula (II) may be used alone or two or more or them may be used in combination.

As stated above, at least one silicon-containing substance selected from the group consisting of the organic silicon compounds represented by general formulae (I) and (II) and hydrolysates thereof can be used.

The silicon-containing substance used in the coating composition of the present invention preferably comprises at least one silicon-containing substance selected from the group consisting of the organic silicon compounds represented by general formula (I) and hydrolysates thereof. Particularly preferred are the organic silicon compounds represented by general formula (I) in which either one of $R^1$ and $R^3$ is an organic group having an epoxy group, $R^2$ is an alkyl group, and a and b are each 0 or 1 provided that a+b is 1 or 2 and hydrolysates thereof. Examples of the preferred organic silicon compound include
glycidoxymethyltrimethoxysilane,
glycidoxymethyltriethoxysilane,
α-glycidoxyethyltrimethoxysilane,
α-glycidoxyethyltriethoxysilane,
β-glycidoxyethyltrimethoxysilane,
β-glycidoxyethyltriethoxysilane,
α-glycidoxypropyltrimethoxysialne,
α-glycidoxypropyltriethoxysilane,
β-glycidoxypropyltrimethoxysilane,
β-glycidoxypropyltriethoxysilane,
γ-glylcidoxypropyltrimethoxysilane,
γ-glycidoxypropyltriethoxysilane,
γ-glycidoxypropyltripropoxysilane,
γ-glycidoxypropyltributoxysilane,
γ-glycidoxypropyltriphenoxysilane,
α-glycidoxybutyltrimethoxysilane,
α-glycidoxybutyltriethoxysilane,
β-glycidoxybutyltriethoxysilane,
γ-glycidoxybutyltrimethoxysilane,
γ-glycidoxybutyltriethoxysilane,
δ-glycidoxybutyltrimethoxysilane,
δ-glycidoxybutyltriethoxysilane,
glycidoxymethylmethyldimethoxysilane,
glycidoxymethylmethyldiethoxysilane,
α-glycidoxyethylmethyldimethoxysilane,
α-glycidoxyethylmethyldiethoxysilane,
β-glycidoxyethylmethyldimethoxysilane,
β-glycidoxyethylethyldimethoxysilane,
α-glylcidoxypropylmethyldimethoxysilane,
α-glycidoxypropylmethyldiethoxysilane,
β-glycidoxypropylmethyldimethoxysilane,
β-glycidoxypropylethyldimethoxysilane,
γ-glycidoxypropylmethyldimethoxysilane,
γ-glycidoxypropylmethyldiethoxysilane,
γ-glycidoxypropylmethyldipropoxysilane,
γ-glycidoxypropylmethyldibutoxysilane,
γ-glycidoxypropylmethyldiphenoxysilane,
γ-glycidoxypropylethyldimethoxysilane, γ-glycidoxypropylethyldiethoxysialne,
γ-glycidoxypropylvinyldimethoxysilane,
γ-glycidoxypropylvinyldiethoxysilane,
and so on.

More preferred are γ-glycidoxypropyltrimethoxysilane, γ-glycidoxypropylmethyldiethoxysilane, and hydrolysates thereof. These may be use alone or as mixtures thereof. γ-glycidoxypropyltrimethoxysilane, γ-glycidoxypropyltrimethyl-diethoxysilane, and hydrolysates thereof may be used together with one or more tetrafunctional compounds represented by general formula (I), corresponding to a+b=0. Examples of such tetrafunctional compounds include tetramethoxysialne, tetraethoxysilane, tetraisopropoxysilane, tetra-n-propoxysilane, tetra-n-butoxysilane, tetra-tert-butoxysilane, and tetra-sec-butoxysilane.

EXAMPLES

The present invention will be described in more detail by examples. However, the present invention should not be construed as being limited thereto.

Example 1

To a dispersion of 1,300 g of diantimony trioxide (manufactured by Mikuni Seiren Co., Ltd.) in 5,587 g of water was added 954 g of 35% aqueous hydrogen peroxide solution and the mixture was heated to 90 to 100° C. for 2 hours for reaction to obtain a diantimony pentoxide sol. The sol had a specific gravity of 1.198, a pH of 1.80, a viscosity of 19.5 mPa·s, a $Sb_2O_5$ content of 18.4% by weight, a primary particle diameter of 20 to 30 nm by transmission electron microscopic observation, and a specific surface area according to the BET method of 55.0 $m^2/g$. The resulting diantimony pentoxide sol of 3,600 g was diluted with deionized water to a $Sb_2O_5$ concentration of 10.0% by weight. After adding 238 g of basic zinc carbonate (manufactured by Sakai Kagaku Co., Ltd., $3ZnCO_5.4Zn(OH)_2$, 70% by weight as ZnO), the mixture was stirred at 100° C. (under reflux) for 11 hours to obtain a slurry. The slurry contained in an amount of 2.4% by weight as ZnO and 9.7% by weight as $Sb_2O_5$, with a $ZnO/Sb_2O_3$ molar ratio being 1.0. The slurry was dried using a spray drier to obtain powder. Results of X-ray diffraction analysis indicated that the peak of the powder coincided with that of hydrated diantimony pentoxide ($Sb_2O_5.xH_2O$). The dry powder (5 g) was charged in a 30 mm (diameter)×600 mm Pyrex glass calcination tube and calcined at 420° C. for 5 hours while introducing a mixed gas with a water vapor/nitrogen gas partial pressure ratio of 0.30, obtained by bubbling nitrogen gas into a water bath at 70° C. at a flow rate of 2 liters/minute. The resulting powder was deep blue and results of X-ray diffraction analysis indicated that the peak of the powder coincided with that of anhydrous zinc antimonate ($ZnSb_2O_3$). The calcined powder had a specific surface area according to the BET method of 38.7 $m^2/g$, a particle diameter, calculated from the specific surface area according to the BET method, of 25.8 nm, and a primary particle diameter of 10 to 50 nm as measured by transmission electron microscopic observation. An article obtained by press molding the powder at 300 $kg/cm^2$ had an electroconductivity of 14 k Ω as measured using a tester and a resistivity of 130 Ω·cm as measured using a four probe method resistivity measuring apparatus (trade name: Rolester, manufactured by Mitsubishi Kagaku Co., Ltd.).

Example 2

To a dispersion of 110 kg of diantimony trioxide (manufactured by Mikuni Seiren Co., Ltd.) and 3.3 kg of basic zinc carbonate (manufactured by Sakai Kagaku Co., Ltd., $3ZnCO_5.4Zn(OH)_2$, 70% by weight as ZnO) in 1,364 kg of water were added 182 kg of 35% aqueous hydrogen peroxide solution and 594 g of 87% formic acid. The mixture was heated to 90 to 100° C. for 2 hours for reaction to obtain a diantimony pentoxide sol. The sol had a specific gravity of 1.174, a pH of 1.44, a viscosity of 1.8 mPa·s, a $Sb_2O_5$ content of 16.3% be weight, a primary particle diameter of 20 to 30 nm by transmission electron microscopic observation, and a specific surface area according to the BET method of 41.3 $m^2/g$. The resulting diantimony pentoxide sol (334 kg) was diluted with deionized water to a $Sb_2O_5$ concentration of 13.3% by weight. After adding 16.9 kg of basic zinc carbonate (manufactured by Sakai Kagaku Co., Ltd., $3ZnCO_5.4Zn(OH)_2$, 70% be weight as ZnO), the mixture was stirred for 6 hours to obtain a slurry. The slurry contained in an amount of 3.1% by weight as ZnO and 12.7% by weight as $Sb_2O_5$, with a $ZnO/Sb_2O_3$ molar ratio being 0.97. The slurry was dried using a spray-drier to obtain powder. Results of X-ray diffraction analysis indicated that the peak of the powder coincided with that of hydrated diantimony pentoxide ($Sb_2O_5.xH_2O$). The dry powder (5 g) was charged in a 30 mm (diameter)×600 mm Pyrex glass calcination tube and calcination was conducted at 460° C. for 5 hours while introducing a mixed gas with a water vapor/nitrogen gas partial pressure ratio of 0.85, obtained by bubbling nitrogen gas into a water bath at 95° C. at a flow rate of 2 liters/minute. The resulting powder was deep blue and results of X-ray diffraction analysis indicated that the peak of the powder coincided with that of anhydrous zinc antimonate ($ZnSb_2O_6$). The calcined powder had a specific surface area according to the BET method of 61.3 $m^2/g$, a particle diameter, calculated from the specific surface area according to the BET method, of 15.8 nm, and a primary particle diameter of 10 to 20 nm as determined by transmission electron microscopic observation. An article obtained by press molding the powder at 300 $kg/cm^2$ had an electroconductivity of 16 k Ω as measured using a tester and a resistivity of 190Ω·cm as measured using a four probe method resistivity measuring apparatus (trade name: Rolester, manufactured by Mitsubishi Kagaku Co., Ltd.).

Example 3

The same operations as in Example 2 were repeated except that the calcination in the Pyrex glass calcination tube was carried out at 540° C. The resulting powder was deep blue and results of X-ray diffraction analysis indicated that the peak of the powder coincided with that of anhydrous zinc antimonate ($ZnSb_2O_6$).

The calcined powder had a primary particle diameter of 20 to 40 nm as measured by transmission electron microscopic observation. An article obtained by press molding the powder at 300 $kg/cm_2$ had an electroconductivity in terms of resistivity of 1.3 k Ω·cm.

Example 4

Dry powder (5 g) of hydrated diantimony pentoxide ($Sb_2O_5.xH_2O$) obtained in Example 2 was charged in a 30 mm (diameter)×600 mm Pyrex glass calcination tube and calcined at 350° C. for 5 hours while introducing a mixed gas with a water vapor/hydrogen gas partial pressure ratio of 0.7, obtained by bubbling hydrogen gas into a water bath at 90° C. at a flow rate of 2 kiters/minute. The resulting powder was deep blue and results of X-ray diffraction analysis indicated that the peak of the powder coincided with that of anhydrous zinc antimonate ($ZnSb_2O_6$).

The calcined powder had a primary particle diameter of 10 to 20 nm as measured by transmission electron microscopic observation. An article obtained by press molding the powder at 300 kg/cm² had an electroconductivity in terms of resistivity of 1.4 k Ω·cm.

Example 5

Dry powder (6 kg) of hydrated diantimony pentoxide ($Sb_2O_5 \cdot xH_2O$) obtained in Example 2 was charged in a 150 mm (diameter) fluidized bed and calcined at 480° C. for 4 hours while introducing a mixed gas with a water vapor/nitrogen gas partial pressure ratio of 0.47 into the fluidized bed, obtained by bubbling nitrogen gas into a water bath at 80° C. at a flow rate of 2.8 Nm²/hour. The resulting powder was deep blue and results of X-ray diffraction analysis indicated that the peak of the powder coincided with that of anhydrous zinc antimonate ($ZnSb_2O_6$). An article obtained by press molding the powder at 300 kg/cm² had an electroconductivity in terms of resistivity of 150 Ω·cm. After grinding the powder using a pin disk, the ground powder (700 g) and water (1,400 g) were charged in a 5-liter attritor (manufactured by Mitsui Kozan Co., Ltd.) and further wet ground with glass beads (1 to 1.5 mm in diameter) for 16 hours. After the wet grinding, the glass beads were separated with deionized water (5.0 kg) to obtain 7.0 kg of an aqueous anhydrous zinc antimonate sol. The resulting aqueous sol was concentrated to 2.3 kg using a rotary evaporator. The aqueous anhydrous zinc antimonate sol thus obtained was transparent deep blue and had a specific gravity of 1.350, a pH of 6.2, a viscosity of 3.9 mPa·s, an electric-conductivity of 296 μs/cm, and a $ZnSb_2O_6$ content of 30.5% by weight. The sol was stable at 50° C. for 1 month. The sol had a primary particle diameter of 10 to 20 nm as measured by transmission electron microscopic observation and a particle diameter of 129 nm using a laser scattering particle size distribution measuring apparatus (trade name: Coulter N4, manufactured by Coulter Co.), and an average particle diameter of 160 nm by a centrifugal sedimentation (CAPA-700, manufactured by Horiba Seisakusho Co., Ltd.). A dry product of the sol had a specific surface area according to the BET method of 62.8 m²/g and a particle diameter of 15.4 nm as calculated from the specific surface area. The sol was coated on a glass plate using an applicator of 0.01 mm and then its transmissions at wavelengths of 200 nm to 3,200 nm were measured using an automatic recording spectrophotometer UV-3100PC (manufactured by Shimazu Seisakusho Co., Ltd.). FIG. 1 shows the results obtained. Also, L*, a*, and b* were measured using a spectral color difference meter TC-1800MK-II (manufactured by Tokyo Denshoku Co., Ltd.). Table 1 shows the results obtained.

Example 6

Dry powder (6 kg) of hydrated diantimony pentoxide ($Sb_2O_5 \cdot xH_2O$) obtained in Example 2 was charged in a 150 mm (diameter) fluidized bed and calcined at 480° C. for 4 hours while introducing a mixed gas with a water vapor/air partial pressure ratio of 0.47 into the fluidized bed, obtained by bubbling into a water bath at 80° C. at a flow rate of 2.8 Nm³/hour. The resulting powder was deep blue and results of X-ray diffraction analysis indicated that the peak of the powder coincided with that of anhydrous zinc antimonate ($ZnSb_2O_6$).

The calcined powder had a primary particle diameter of 10 to 20 nm as measured by transmission electron microscopic observation. An article obtained by press molding the powder at 300 kg/cm² had an electroconductivity in terms of resistivity of 170 Ω·cm.

Comparative Example 1

The same operations as in Example 2 were repeated except that the gas to be introduced into the Pyrex glass calcination tube was replaced by nitrogen gas containing no water-vapor. The powder thus obtained was pale yellowish and results of X-ray diffraction analysis indicated that the peak of the powder coincided with that of diantimony pentoxide ($Sb_2O_5$). An article obtained by press molding the powder at 300 kg/cm² had no electroconductivity.

Comparative Example 2

The same operations as in Example 2 were repeated except that the gas to be introduced into the Pyrex glass calcination tube was replaced by air. The powder thus obtained was yellowish and results of X-ray diffraction analysis indicated that the peak of the powder coincided with that of diantimony pentoxide ($Sb_2O_5$). An article obtained by press molding the powder at 300 kg/cm² had no electroconductivity.

Comparative Example 3

The same operations as in Example 4 were repeated except that the gas to be introduced into the Pyrex glass calcination tube was replaced by hydrogen gas containing no moisture. The powder thus obtained was of metallic color and results of X-ray diffraction analysis of the powder indicated that there were observed peaks of anhydrous zinc antimonate ($ZnSb_2O_6$) and of metallic antimony, so that it was recognized that a part of the anhydrous zinc antimonate were reduced.

Reference Example 1

A dry powder (30 g) of hydrated diantimony pentoxide ($Sb_2O_5xH_2O$) obtained in Example 1 was calcined in a box-type electric oven at 610° C. for 13 hours to obtain blue green powder. Results of X-ray diffraction analysis indicated that the peak of the powder coincided with that of anhydrous zinc antimonate ($ZnSb_2O_6$). A dry product of the sol had a specific surface area according to the BET method of 36.5 m²/g and a particle diameter of 26.5 nm as calculated from the specific surface area. An article obtained by press molding the powder at 300 kg/cm² had an electroconductivity in terms of resistivity of 100 Ω·cm. This powder (118 g) was added in 400 g of deionized water and wet ground in a ball mill with glass beads (2 to 3 mm in diameter) for 96 hours. After the wet grinding, the glass beds were removed to obtain 1,131 g of aqueous zinc antimonate sol. The aqueous sol thus obtained was concentrated to 522 g in a rotary evaporator. The aqueous anhydrous zinc antimonate sol thus obtained was transparent blue green and had a specific gravity of 1.228, a pH of 8.3, a viscosity of 2.0 mPa·s, an electric-conductivity of 411 μs/cm, and a $ZnSb_2O_6$ content of 22.6% by weight. The sol had a particle diameter of 10 to 50 nm as determined by transmission electron microscopic observation and a primary particle diameter of 98 nm using a laser scattering particle size distribution measuring apparatus, and an average particle diameter of 70 nm by a centrifugal sedimentation. A dry product of the sol had a specific surface area according to the BET method of 37.6 m²/g and a particle diameter of 25.7 nm as calculated from the specific surface area.

Reference Example 2

A dry powder (6 kg) of hydrated diantimony pentoxide ($Sb_2O_5 \cdot xH_2O$) obtained in Example 2 was charged in a fluidized bed and calcined at 620° C. for 5 hours while introducing air at a flow rate of 2.8 Nm²hour to obtain blue green powder. Results of X-ray diffraction analysis indicated that the peak of the powder coincided with that of anhydrous zinc antimonate ($ZnSb_2O_6$). An article obtained by press molding the powder at 300 kg/cm² had an electroconductivity in terms of resistivity of 130 Ω·cm. After the powder was ground using a pin disk, the ground powder at 700 g and water at 1,400 g were charged in a 5-liter attritor and further wet ground with glass beads (1 to 1.5 mm in diameter) for 16 hours. After the wet grinding, the glass beads were separated with deionized water (5.0 kg) to obtain 7.0 kg of an aqueous anhydrous zinc antimonate sol. The resulting aqueous sol was concentrated to 2.3 kg using a rotary evaporator. The aqueous anhydrous zinc antimonate sol thus obtained was transparent blue green and had a specific gravity of 1.344, a pH of 6.9, a viscosity of 3.4 mPa·s, an electric-conductivity of 300 μs/cm, and a $ZnSb_2O_6$ content of 30.4% by weight. The sol had a particle diameter of 10 to 20 nm as measured by transmission electron microscopic observation and a primary particle diameter of 129 nm using a laser scattering particle size distribution measuring apparatus, and an average particle diameter of 160 nm by a centrifugal sedimentation. A dry product of the sol had a specific surface area according to the BET method of 65.8 m²/g and a particle diameter of 14.7 nm as calculated from the specific surface area. The sol was coated on a glass plate using an applicator of 0.01 mm and then its transmissions at wavelengths of 200 nm to 3,200 nm were measured using an automatic recording spectrophotometer UV-3100PC (manufactured by Shimazu Seisakusho Co., Ltd.). FIG. 1 shows the results obtained. Also, L*, a*, and b* were measured using a spectral color difference meter TC-1800MK-II (manufactured by Tokyo Denshoku Co., Ltd.). Table 1 shows the results obtained.

TABLE 1

|  | L* | a* | b* |
|---|---|---|---|
| Example 5 | 97.52 | −0.84 | 1.15 |
| Reference Example 2 | 98.52 | −0.88 | 1.58 |

In Table 1, L* indicates the relationship between white and black. As for a*, the (+) a* direction indicates increased red and the (−) a* direction indicates increased green. As for b*, the b* direction indicates increased yellow and the (−) b* direction indicates increased blue. Comparison between Example 5 and Reference Example 2, in which the values of L* and a* are almost in the same range, indicated that the product of Example 5 was deeper in blue than that of Reference Example 2 and that the product of Reference Example 2 was more shifted toward yellow than that of Example 5. When the electroconductive zinc antimonate obtained by the present invention is used as a coating material, it provides excellent hue even when coated on a plastic film or glass substrate without yellowing, which is disliked because of causing misunderstanding that deterioration has occurred.

Further, as can be seen from FIG. 1, the glass plate coated with a coating material containing the electroconductive zinc antimonate of Example 5 had a lower transmission in infrared region and, hence, a higher absorption of infrared rays than that coated with a coating material containing the electroconductive zinc antimonate of Reference Example 2.

An object of the present invention relates to an improvement in a method of producing electroconductive anhydrous zinc antimonate. Another object of the present invention is to provide a method of producing anhydrous zinc antimonate that permits production of electroconductive anhydrous zinc antimonate at relatively low temperatures by controlling atmosphere during calcination step after mixing a zinc compound and colloidal antimony oxide, which is advantageous from the viewpoints of simplification of apparatus and energy saving and which is free of generation of big particles due to sintering of smaller particles thanks to the low calcination temperature.

Namely, there provides a method of producing electroconductive anhydrous zinc antimonate, comprising the steps of: mixing a zinc compound and a colloidal antimony oxide; and calcining the mixture at 300 to 680° C., preferably at 350 to 500° C., in a gas containing steam to produce an electroconductive anhydrous zinc antimonate. In the present invention, the calcination temperature is lower than that in the conventional methods and therefore it is effective, in particular, for producing electroconductive anhydrous zinc antimonate in the form of smaller particles. In particular, in the production of electroconductive anhydrous zinc antimonate that comprises small particles having a primary particle diameter of below 50 nm, the method of the present invention is useful for producing powder of deep blue to deep blue green color, which color is characteristic to electroconductive anhydrous zinc antimonate since solid phase reaction proceeds well. Further, the electroconductive anhydrous zinc antimonate of the present invention has a feature that it is excellent in absorption capacity of heat rays.

The electroconductive anhydrous zinc antimonate of the present invention can be used as an antistatic agent for plastic molded articles, films, plastics fibers, glass, paper and so on. In particular, it has a decreased transmission at wavelengths of 800 nm or higher, hence, it has an excellent heat ray absorption capacity so that it is useful as a heat ray absorbent for films, plastics fibers, glass and so on.

Since the electroconductive anhydrous zinc antimonate sol of the present invention is highly transparent, it can be used as a transparent antistatic agent, a high reflection hard coat composition, an antireflective agent, a heat ray absorbent and the like by being mixed with a partial hydrolysate of a silane coupling agent, ethyl silicate or its hydrolysate, a resin emulsion or the like. The electroconductive anhydrous zinc antimonate sol of the present invention is more desirably since when coated on plastics molded articles, films, glass or the like in particular, it presents less sepia or less yellow hue that is disliked as a color indicating deterioration.

What is claimed is:

1. A method of producing electroconductive anhydrous zinc antimonate, comprising the steps of:
   mixing a zinc compound and a colloidal antimony oxide in a $ZnO/Sb_2O_3$ molar ratio of 0.8 to 1.2; and
   calcining the mixture at 300 to 680° C. in a gas containing steam to produce an electroconductive anhydrous zinc antimonate having a $ZnO/Sb_2O_3$ molar ratio of 0.8 to 1.2 and a primary particle diameter of 5 to 100 nm,
   wherein a partial pressure ratio water vapor to the gas in the gas containing steam is 0.10 to 1.0.

2. The method as claimed in claim 1, wherein said calcination is carried out at a temperature of 350° C. or higher and below 500° C.

3. The method as claimed in claim 2, wherein said electroconductive anhydrous zinc antimonate has a primary particle diameter of 5 to 50 nm.

4. The method as claimed in claim 2, wherein said gas is air or nitrogen.

5. The method as claimed in claim 1, wherein said electroconductive anhydrous zinc antimonate has a primary particle diameter of 5 to 50 nm.

6. The method as claimed in claim 5, wherein said gas is air or nitrogen.

7. The method as claimed in claim 1, wherein said gas is air or nitrogen.

8. The method as claimed in claim 1, wherein said zinc compound is selected from a group consisting of zinc hydroxide, zinc oxide, inorganic acid salts of zinc, and organic acid salts of zinc.

9. The method as claimed in claim 1, wherein said calcining as at a temperature below 500° C.

10. The method as claimed in claim 1, wherein said calcining is at a temperature no lower than 400° C. and below 500° C.

* * * * *